UNITED STATES PATENT OFFICE.

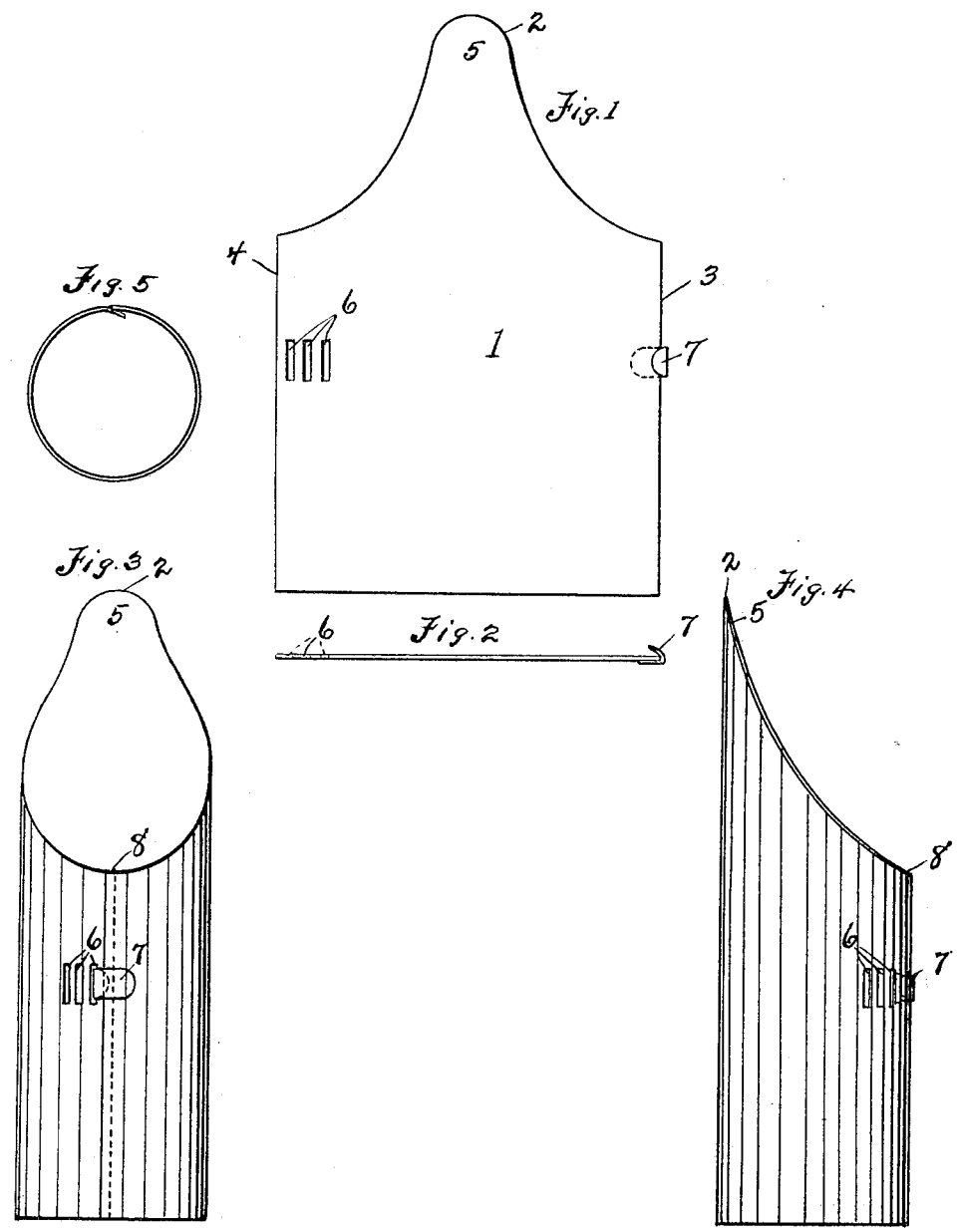

FRANCIS BALL, OF GLENSIDE, PENNSYLVANIA.

CELERY-HANDLER.

1,117,625.  Specification of Letters Patent.  Patented Nov. 17, 1914.

Application filed August 11, 1913. Serial No. 784,065.

*To all whom it may concern:*

Be it known that I, FRANCIS BALL, a subject of the King of Great Britain, residing at Glenside, in the county of Montgomery, State of Pennsylvania, have invented a new and useful Improvement in Celery-Handlers, of which the following is a specification.

My invention relates to devices for handling celery and has for its object to produce a device by means of which the celery grower can use a tube for bleaching purposes, the celery being neatly and quickly handled so as to permit of the placing of such a tube over each plant without breaking or injuring in the least such plant. I accomplish this result by means of the article of manufacture presently described and fully shown by the accompanying drawings forming part of this application and in which:—

Figure 1 is a front elevation of my device showing the same flattened out, being made of one piece of material. Fig. 2 is a plan edge view of the same. Fig. 3 is a front elevation showing the handler in its normal condition. Fig. 4 is a side elevation of the same. Fig. 5 a plan view thereof.

Similar numerals of reference designate corresponding parts throughout the several views.

My invention consists preferably of a thin sheet 1 of metal possessing a spring quality, which, when the device is in normal condition, will spring into and retain the closed tubular form shown in Fig. 3. One end of this sheet is formed or is tapered to a point 2 by cutting the sides 3 and 4 whereby, when the device is in a normal or closed condition, the upper part 5 of the body of said device, will present a flat face to permit of the bleaching tube, which is preferably collapsed or flat, being easily and quickly adjusted over the said handler, the tapering, cut-away sides forming a wedge and guide that will automatically open up the collapsed tube as it is being pushed or pulled down and over the celery handler. This handler is provided with means, or a device of suitable construction, for holding the edges together and the handler securely closed after being placed around the celery plant; the means shown consisting of one or more slots 6, one in the rear of the other, in one edge; and a hook 7 on the opposite edge adapted to engage said slots.

The operation is as follows: The stalks of the celery plant are gathered in by the operator who then places the open handler around said plant and securing it by the catch; he then draws the handler up until the bushy tops of the celery disappear within the closed portion 8 of said handler; the bleaching tube (which will form the subject matter of another application to be filed by me), is then applied to the point 2 of the handler and slid down over the same (the tapering sides opening said tube) until said tube touches the ground when the handler is easily and quickly withdrawn leaving the celery plant entirely and effectually within the bleaching tube.

Having now described my invention, what I claim as new and desire to secure by Letters Patent is:—

1. A celery handler consisting of a sheet of material having its side edges cut away at one end so as to form a tapering point and provided with means for holding said handler around a celery plant.

2. A celery handler consisting of a sheet of material tapered to a point at one end and provided with means for holding it around a celery plant.

3. A celery handler consisting of a sheet of material tapered to a point at one end in such a manner that when said sheet is formed into a tube the edges of the tapered end will form a wedge whereby a collapsed bleaching tube will be automatically opened when slid over said handler.

4. A celery handler consisting of a sheet of material tapered to a point at one end in such a manner that when said sheet is formed into a tube the edges of the tapered end will form a wedge whereby a collapsed bleaching tube will be automatically opened when slid over said handler; and means on said handler for holding it around a celery plant.

FRANCIS BALL.

Witnesses:
  MARY F. LYONS,
  ANDREW RYAN.

Copies of this patent may be obtained for five cents each, by addressing the "Commissioner of Patents, Washington, D. C."